United States Patent
Yanagisawa et al.

(10) Patent No.: US 10,547,831 B2
(45) Date of Patent: Jan. 28, 2020

(54) DISPLAY DEVICE AND DISPLAY DEVICE FRAME

(71) Applicant: SEMICONDUCTOR ENERGY LABORATORY CO., LTD., Atsugi-shi, Kanagawa-ken (JP)

(72) Inventors: Yuichi Yanagisawa, Kanagawa (JP); Masao Kasuga, Tochigi (JP); Hisao Ikeda, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 26 days.

(21) Appl. No.: 14/548,843

(22) Filed: Nov. 20, 2014

(65) Prior Publication Data

US 2015/0145971 A1 May 28, 2015

(30) Foreign Application Priority Data

Nov. 27, 2013 (JP) ................................. 2013-244742

(51) Int. Cl.
 *H04N 13/30* (2018.01)
(52) U.S. Cl.
 CPC ....... *H04N 13/30* (2018.05); *H04N 2213/001* (2013.01); *H04N 2213/002* (2013.01); *H04N 2213/003* (2013.01)
(58) Field of Classification Search
 CPC ......... H04N 13/0418; H04N 2213/003; H04N 2213/002
 USPC .......................................................... 348/54
 See application file for complete search history.

(56) References Cited

U.S. PATENT DOCUMENTS

| 4,577,928 | A | * | 3/1986 | Brown | .................. G06F 1/1609 348/834 |
|---|---|---|---|---|---|
| 6,144,417 | A | | 11/2000 | Yanagisawa | |
| 7,073,908 | B1 | | 7/2006 | Provitola | |
| 7,086,735 | B1 | | 8/2006 | Provitola | |
| 7,547,362 | B2 | | 6/2009 | Jung et al. | |

(Continued)

FOREIGN PATENT DOCUMENTS

| CN | 103152590 A | 6/2013 |
|---|---|---|
| JP | 58-027711 | 2/1983 |

(Continued)

OTHER PUBLICATIONS

Three Dimensional Effect Filter-Stress of Three Dimensional Effect—, The Journal of The Institute of Image Information and Television Engineers, Nov. 17, 2000, vol. 24, No. 72, pp. 7-12, The Institute of Image Information and Television Engineers.

*Primary Examiner* — Thai Q Tran
*Assistant Examiner* — Nienru Yang
(74) *Attorney, Agent, or Firm* — Nixon Peabody LLP; Jeffrey L. Costellia

(57) ABSTRACT

To provide a display device that gives a viewer a strong stereoscopic effect or sense of depth in a two-dimensional image and a display device that gives a viewer a natural stereoscopic effect or sense of depth in a two-dimensional image, a display device includes a frame portion, and a display portion which has a display surface on a frame portion side and is located so as to be apart from the frame portion with a distance therebetween. The display portion overlaps with an opening of the frame portion, and an end portion of the display portion overlaps with the frame portion. The distance between the frame portion and the display portion is variable.

13 Claims, 9 Drawing Sheets

(56) References Cited

U.S. PATENT DOCUMENTS

| | | |
|---|---|---|
| 7,580,085 B2 | 8/2009 | Jacobs et al. |
| 8,067,057 B2 | 11/2011 | Jung et al. |
| 8,305,334 B2 | 11/2012 | Arisato et al. |
| 8,711,306 B2 | 4/2014 | Oohira et al. |
| 8,749,129 B2 | 6/2014 | Shimakawa et al. |
| 9,294,759 B2 | 3/2016 | Hirai |
| 9,804,405 B2 | 10/2017 | Yanagisawa et al. |
| 2004/0131758 A1* | 7/2004 | Jung ............... B05C 5/0216 427/8 |
| 2009/0207126 A1* | 8/2009 | Arisato ........... G02F 1/133308 345/102 |
| 2010/0271290 A1 | 10/2010 | Tomisawa et al. |
| 2010/0302136 A1* | 12/2010 | Arcuri ............ G02B 27/0093 345/156 |
| 2011/0254037 A1 | 10/2011 | Arasawa |
| 2012/0314158 A1* | 12/2012 | Oohira ............... G02B 6/0081 349/62 |
| 2013/0114193 A1* | 5/2013 | Joo ..................... F16M 11/08 361/679.01 |
| 2013/0147930 A1* | 6/2013 | Hirai ................... H04N 13/04 348/54 |
| 2013/0229798 A1* | 9/2013 | Shimakawa ......... G02B 5/045 362/235 |
| 2013/0286298 A1* | 10/2013 | Sakuma ................ H04N 5/64 348/836 |
| 2015/0145755 A1 | 5/2015 | Yamazaki et al. |
| 2015/0146352 A1 | 5/2015 | Yanagisawa et al. |

FOREIGN PATENT DOCUMENTS

| | | |
|---|---|---|
| JP | 63-138587 | 9/1988 |
| JP | 01-092784 A | 4/1989 |
| JP | 03-125184 A | 5/1991 |
| JP | 07-160202 A | 6/1995 |
| JP | 09-187573 A | 7/1997 |
| JP | 2003-032706 A | 1/2003 |
| JP | 2004-199076 A | 7/2004 |
| JP | 2004-245889 A | 9/2004 |
| JP | 2005-531804 | 10/2005 |
| JP | 2006-293183 | 10/2006 |
| JP | 2008-527918 | 7/2008 |
| JP | 2008-209839 A | 9/2008 |
| JP | 2009-192770 A | 8/2009 |
| JP | 2009-251419 A | 10/2009 |
| JP | 2011-228759 A | 11/2011 |
| JP | 2011-238908 A | 11/2011 |
| JP | 2012-179167 A | 9/2012 |
| JP | 2012-242586 A | 12/2012 |
| JP | 2012-255937 A | 12/2012 |
| JP | 2013-054129 A | 3/2013 |
| JP | 2013-121031 A | 6/2013 |
| JP | 2013-146314 A | 8/2013 |
| JP | 2013-228869 A | 11/2013 |
| JP | 2015-127799 A | 7/2015 |
| WO | WO-2004/003630 | 1/2004 |
| WO | WO-2006/076173 | 7/2006 |
| WO | WO-2008/149425 | 12/2008 |
| WO | WO-2013/108665 | 7/2013 |

* cited by examiner

FIG. 1A
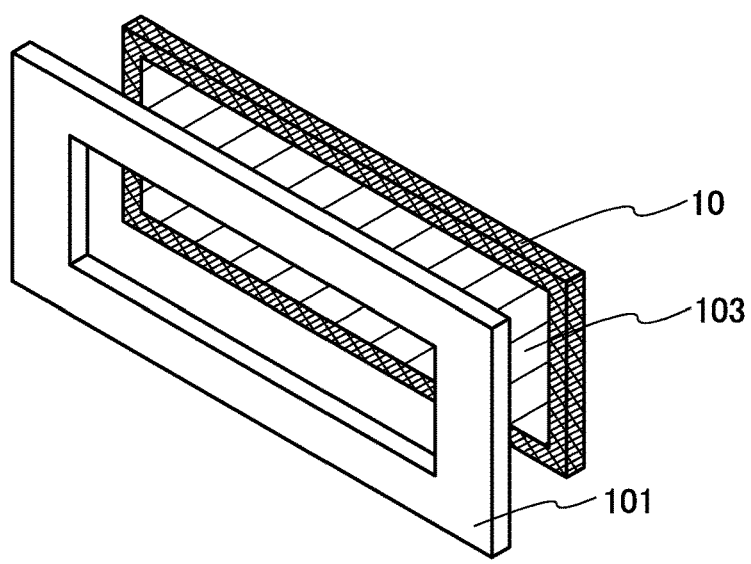
FIG. 1B
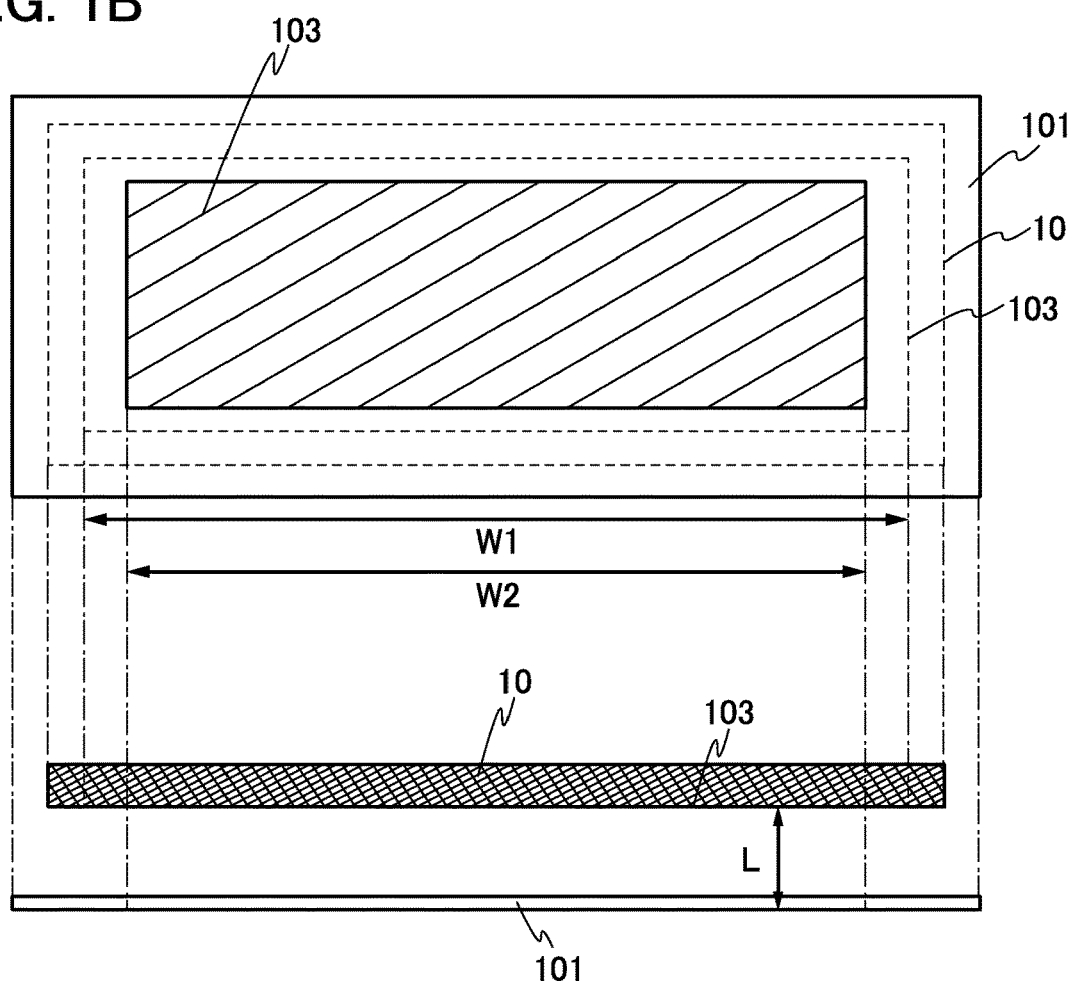
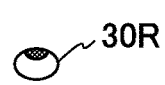

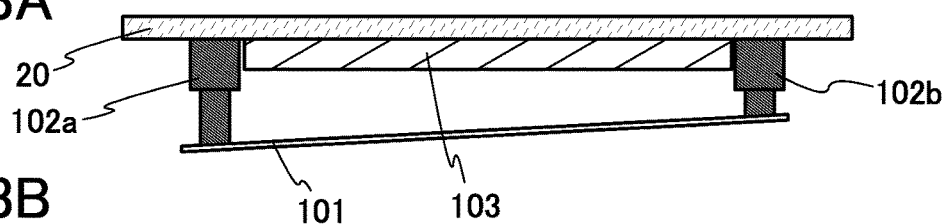
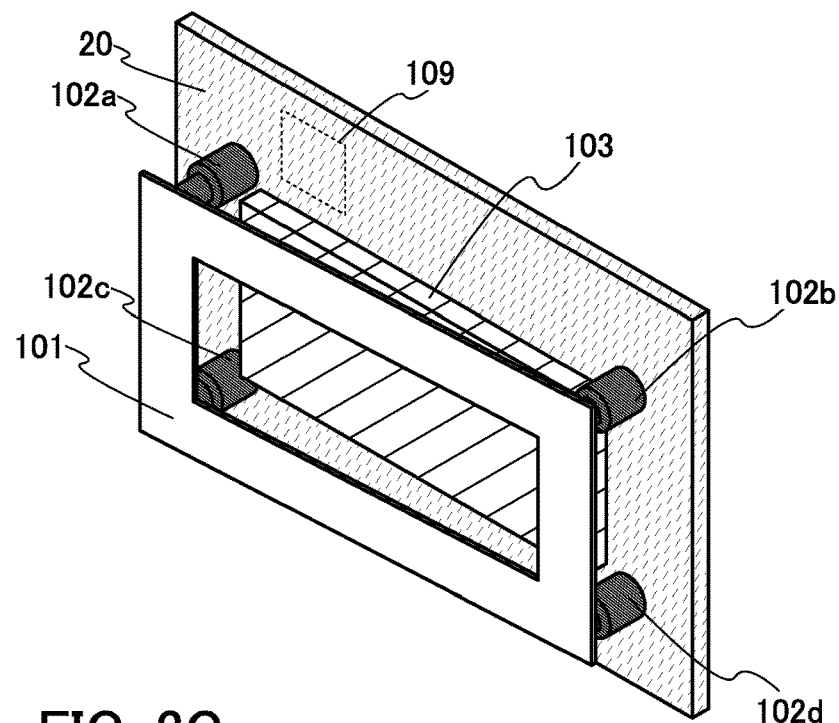
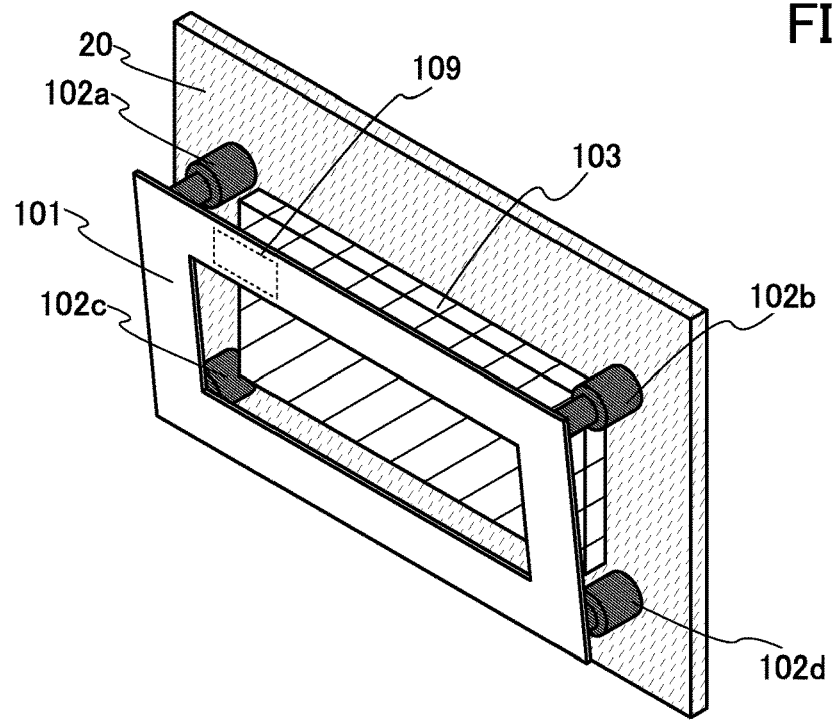
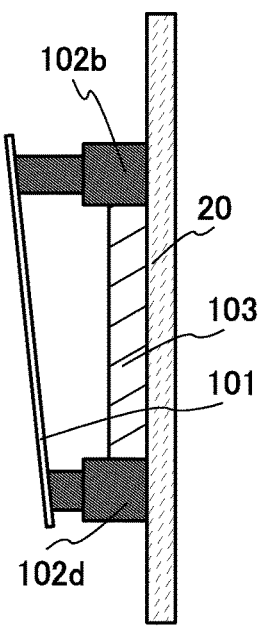

DISPLAY DEVICE AND DISPLAY DEVICE FRAME

BACKGROUND OF THE INVENTION

1. Field of the Invention

One embodiment of the present invention relates to a device such as a display device, a semiconductor device, a light-emitting device, or a liquid crystal display device, and a frame that can be used for the device.

Note that one embodiment of the present invention is not limited to the above technical field. One embodiment of the invention disclosed in this specification and the like relates to an object, a method, and a manufacturing method. In addition, one embodiment of the present invention relates to a process, a machine, manufacture, or a composition of matter. Specifically, examples of the technical field of one embodiment of the present invention disclosed in this specification include a display device, a semiconductor device, a light-emitting device, a power storage device, a storage device, an electronic device, a lighting device, an input device (e.g., a touch sensor), an output device, an input/output device (e.g., a touch panel), a driving method thereof, and a manufacturing method thereof.

2. Description of the Related Art

A variety of display devices ranging from large display devices such as television receivers to small display devices such as cellular phones are put on the market. As higher value added products, display devices capable of displaying stereoscopic images have been actively developed to provide more realistic images.

Physiological factors in recognition of objects as stereoscopic objects by humans are binocular parallax, convergence, focus slide, motion parallax, object size, spatial layout, contrast, shading, and the like.

For example, a display device that displays a stereoscopic image using binocular disparity is known. Such a display device is configured to display, on one screen, an image to be seen from the position of the left eye of a viewer (an image for left eye) and an image to be seen from the position of the right eye of the viewer (an image for right eye). The viewer sees the image for left eye with the left eye and the image for right eye with the right eye and is thus allowed to see a stereoscopic image.

As one example of display devices using eyeglasses, there is a display device which displays an image for left eye and an image for right eye alternately on a screen in synchronization with a shutter provided in eyeglasses, whereby the left eye of a viewer is allowed to see only the image for left eye and the right eye of the viewer is allowed to see only the image for right eye, alternately. Thus, the viewer can see a stereoscopic image.

Furthermore, in a display device using a parallax barrier which allows a viewer to see a stereoscopic image with naked eyes, a screen is divided into a plurality of regions for left eye and a plurality of regions for right eye (e.g., strip-like regions) arranged side by side. A parallax barrier is provided to overlap with the boundaries of the regions. On the divided screen, an image for left eye and an image for right eye are displayed at the same time. With the parallax barrier, the regions for displaying the image for right eye are hidden from the left eye of a viewer and the regions for displaying the image for left eye are hidden from the right eye of the viewer; consequently, the left eye is allowed to see only the image for left eye and the right eye is allowed to see only the image for right eye at the same time. Thus, the viewer can see a stereoscopic image.

Note that a display device including a switchable parallax barrier for achieving switching between a two-dimensional image display mode and a stereoscopic image display mode is known (Patent Document 1).

In addition, a light-emitting element using an electroluminescence (hereinafter also referred to as EL) phenomenon is also known. This light-emitting element is a self-luminous type; therefore, high contrast and high speed of response to an input signal are achieved. Furthermore, a display device to which this light-emitting element is applied and which consumes low power, is manufactured in a simple process, and is easily adapted to the increase in definition and the size of a substrate is known (Patent Document 2).

REFERENCE

Patent Document

[Patent Document 1] PCT International Publication No. WO2004/003630
[Patent Document 2] Japanese Published Patent Application No. 2011-238908

SUMMARY OF THE INVENTION

A display device utilizing eyeglasses with shutters displays images for left eye and images for right eye alternately on a screen, which results in an increase in the frequency of image writing to a pixel portion in one frame period as compared with the case of displaying a two-dimensional image. This requires a driver circuit which can be driven at high frequency and also increases the power consumption of the display device. In addition, it is also indicated that the difference between a physical distance from a viewer to the display device and a cognitive distance from an angle of convergence when the viewer sees the display device makes the brain of the viewer confused and therefore arises a phenomenon such as eye strain or brain strain.

In a display device with a parallax barrier, the number of pixels that contribute to image display for left eye and the number of pixels that contribute to image display for right eye in the horizontal direction of a pixel portion are each half of the actual number of the pixels in the horizontal direction of the pixel portion, which hinders display of high-definition images.

Accordingly, it is required to provide a display device consuming low power or a high-definition display device or provide a viewing environment comfortable for a viewer. From this, it is necessary to display a two-dimensional image that gives a viewer a strong sense of depth or stereoscopic effect instead of images with binocular disparity such as images for left eye and images for right eye.

It is an object of one embodiment of the present invention to give a viewer a strong stereoscopic effect or sense of depth in a two-dimensional image. Another object of one embodiment of the present invention is to give a viewer a natural or substantially natural stereoscopic effect or sense of depth in a two-dimensional image.

Another object of one embodiment of the present invention is to provide a novel display device. Another object of one embodiment of the present invention is to provide a novel frame that can be used for a display device. Another object of one embodiment of the present invention is to provide a display device that gives a viewer a strong stereoscopic effect or sense of depth even in a two-dimensional image or a frame that can be used for a display device and gives a viewer a strong stereoscopic effect or sense of depth in a two-dimensional image. Another object of one embodiment of the present invention is to provide a display device that gives a viewer a natural stereoscopic effect or sense of depth even in a two-dimensional image or a frame that can be used for a display device and gives a viewer a natural stereoscopic effect or sense of depth in a two-dimensional image. Another object of one embodiment of the present invention is to provide a display device that gives a viewer less visual fatigue, and a strong stereoscopic effect or sense of depth even in a two-dimensional image or a frame that can be used for a display device and gives a viewer less visual fatigue, and a strong stereoscopic effect or sense of depth even in a two-dimensional image. Another object of one embodiment of the present invention is to provide a display device that gives a viewer less visual fatigue, and a natural stereoscopic effect or sense of depth even in a two-dimensional image or a frame that can be used for a display device and gives a viewer less visual fatigue, and a natural stereoscopic effect or sense of depth even in a two-dimensional image.

Note that the description of these objects does not disturb the existence of other objects. In one embodiment of the present invention, there is no need to achieve all the objects. Other objects will be apparent from and can be derived from the description of the specification, the drawings, the claims, and the like.

According to one embodiment of the present invention, a display device includes a frame portion, and a display portion which has a display surface on a frame portion side and which is located so as to be apart from the frame portion with a distance therebetween. The display portion overlaps with an opening of the frame portion, and an end portion of the display portion overlaps with the frame portion. The distance between the frame portion and the display portion is variable.

In this specification, the distance between the frame portion and the display portion corresponds to a distance between the display surface of the display portion and the surface of the frame portion on a viewer side. That is, the distance between the frame portion and the display portion can be changed in such a manner that at least either the distance between the display surface of the display portion and the surface of the frame portion facing the display surface or the thickness of the frame portion itself (a distance between a surface of the frame portion facing the display surface and a surface of the frame portion on the viewer side) is changed. Even when the frame portion and the display portion are in contact with each other, the frame portion and the display portion are located so as to be apart from each other with a distance therebetween by the thickness of the frame portion.

In the above display device, it is preferable that the frame portion be attachable and detachable to and from the display portion freely.

In the above display device, the frame portion may have a light-blocking property.

According to another embodiment of the present invention, a display device frame includes a frame portion which is attachable to a display panel and whose distance from the display panel is variable, an arithmetic processing portion which is supplied with image data and which can supply a control signal, and a drive control portion which is supplied with the control signal and which can change the distance of the frame portion from the display panel. The arithmetic processing portion generates the control signal by analyzing the image data.

The above display device frame may include a driver portion which is controlled by the drive control portion and which can change the position of the frame portion.

According to one embodiment of the present invention, a viewer can have a strong stereoscopic effect or sense of depth in a two-dimensional image. According to one embodiment of the present invention, a viewer can have a natural stereoscopic effect or sense of depth in a two-dimensional image.

According to one embodiment of the present invention, a novel display device can be provided. According to one embodiment of the present invention, a novel display device can be provided. According to one embodiment of the present invention, a display device that gives a viewer a strong stereoscopic effect or sense of depth even in a two-dimensional image or a novel frame that can be used for a display device and gives a viewer a strong stereoscopic effect or sense of depth even in a two-dimensional image can be provided. According to one embodiment of the present invention, a display device that gives a viewer a natural stereoscopic effect or sense of depth even in a two-dimensional image or a novel frame that can be used for a display device and gives a viewer a natural stereoscopic effect or sense of depth even in a two-dimensional image can be provided. According to one embodiment of the present invention, a display device that gives a viewer less visual fatigue, and a strong stereoscopic effect or sense of depth even in a two-dimensional image or a frame that can be used for a display device and gives a viewer less visual fatigue, and a strong stereoscopic effect or sense of depth even in a two-dimensional image can be provided. According to one embodiment of the present invention, a display device that gives a viewer less visual fatigue, and a natural stereoscopic effect or sense of depth even in a two-dimensional image or a frame that can be used for a display device and gives a viewer less visual fatigue, and a natural stereoscopic effect or sense of depth even in a two-dimensional image can be provided.

Note that the description of these effects does not disturb the existence of other effects. One embodiment of the present invention does not necessarily achieve all the objects listed above. Other effects will be apparent from and can be derived from the description of the specification, the drawings, the claims, and the like.

BRIEF DESCRIPTION OF THE DRAWINGS

FIGS. 1A and 1B illustrate an example of a display device.
FIGS. 3A to 3D illustrate examples of a display device.

DETAILED DESCRIPTION OF THE INVENTION

Figure 2A:
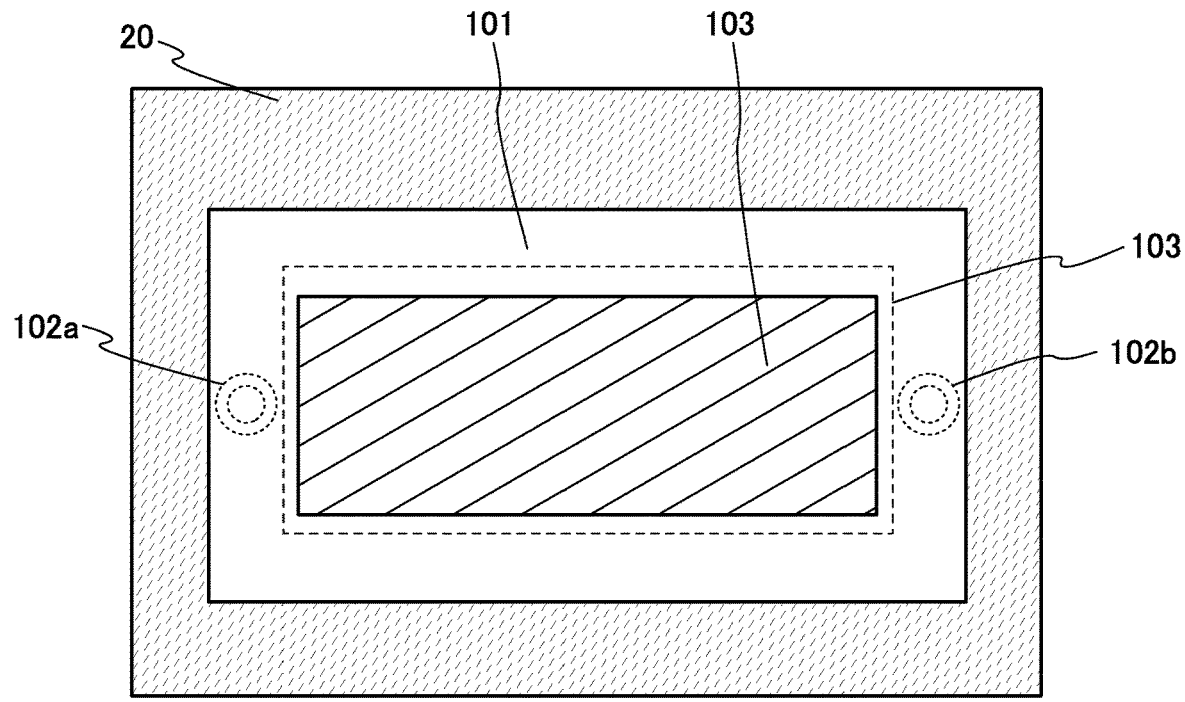
FIGS. 2A to 2C illustrate an example of a display device.

Embodiment will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiment below.

Note that in the structures of the invention described below, the same portions or portions having similar functions are denoted by the same reference numerals in different drawings, and description of such portions is not repeated. Furthermore, the same hatching pattern is applied to portions having similar functions, and the portions are not especially denoted by reference numerals in some cases.

In addition, the position, size, range, or the like of each structure illustrated in drawings and the like is not accurately represented in some cases for easy understanding. Therefore, the disclosed invention is not necessarily limited to the position, the size, the range, or the like disclosed in the drawings and the like.

Display devices of embodiments of the present invention will be described below with reference to FIGS. 1A and 1B, FIGS. 2A to 2C, FIGS. 3A to 3D, FIGS. 4A and 4B, FIGS. 5A to 5D, and FIGS. 6A to 6D.

According to one embodiment of the present invention, a display device includes a frame portion, and a display portion which has a display surface on a frame portion side and which is located so as to be apart from the frame portion with a distance therebetween. The display portion overlaps with an opening of the frame portion, and an end portion of the display portion overlaps with the frame portion. The distance between the frame portion and the display portion is variable.

The display device of one embodiment of the present invention includes the frame portion between a viewer and the display portion, whereby the viewer has an optical illusion that the position of the display portion is different from actual one, stereoscopic information is corrected by brain, and thus the viewer can feel a stereoscopic effect or a sense of depth in a two-dimensional image.

When the distance between the display portion and the frame portion is constant in the display device, a problem might be caused. For example, the way a viewer feels a stereoscopic effect or a sense of depth differs depending on a viewer, and an appropriate distance between the display portion and the frame portion might vary among individuals. In the case where a viewer feels that the frame portion is not in an appropriate position, the viewer cannot feel easily a stereoscopic effect or a sense of depth in a two-dimensional image in some cases. In contrast, when the stereoscopic effect or sense of depth is too strong, loads of the brain or eyes become high and accordingly the viewer might have severe strain. Furthermore, depending on an image displayed on the display portion, the intensity of a stereoscopic effect or a sense of depth might be changed without intent or might not be changed though intended to be changed.

In the above display device of one embodiment of the present invention, the distance between the frame portion and the display portion is variable. Therefore, the distance between the frame portion and the display portion can be adjusted so that a viewer can feel a natural stereoscopic effect and less fatigue. In addition, by adjusting the distance between the frame portion and the display portion depending on an image displayed on the display portion, a change of the intensity of a stereoscopic effect or a sense of depth without intent can be suppressed or the intensity of a stereoscopic effect or a sense of depth can be changed intentionally. Accordingly, in the display device of one embodiment of the present invention, a viewer can feel a strong stereoscopic effect or sense of depth in a two-dimensional image and can feel less visual fatigue.

Note that the distance between the frame portion and the display portion may be controlled by a viewer himself/herself or may be automatically controlled by the display device or the frame portion. In addition, the distance between the frame portion and the display portion may be changed while an image is reproduced in the display portion. Alternatively, the distance between the frame portion and the display portion may be constant while reproducing an image and can be changed while not operating.

A positional relation between the display portion and the frame portion of the display device of one embodiment of the present invention is described with a perspective view of a display device illustrated in FIG. 1A and a front view (a view seen from the display surface side) and a top view of the display device illustrated in FIG. 1B.

The display device in FIGS. 1A and 1B includes a display panel 10 having a display portion 103 and a frame portion 101. The display portion 103 includes a display surface on the frame portion 101 side. The display portion 103 and the frame portion 101 are located so as to be apart from each other with a distance L therebetween. The display portion 103 overlaps with an opening of the frame portion 101, and an end portion of the display portion 103 overlaps with the frame portion 101.

In this specification, the distance L between the frame portion 101 and the display portion 103 corresponds to a distance between the display surface of the display portion 103 and the surface of the frame portion 101 on a viewer side. That is, the distance L between the frame portion 101 and the display portion 103 can be changed in such a manner that at least either the distance between the display surface of the display portion 103 and the surface of the frame portion 101 facing the display surface or the thickness of the frame portion 101 itself (a distance between a surface of the frame portion 101 facing the display surface and a surface of the frame portion 101 on the viewer side) is changed. Even when the frame portion 101 and the display portion 103 are in contact with each other, the frame portion 101 and the display portion 103 are located so as to be apart from each other with a distance therebetween by the thickness of the frame portion 101.

For example, the distance L between the frame portion 101 and the display portion 103 is 1 mm or more, preferably 1 cm or more, further preferably 5 cm or more, in which case a viewer can feel a strong stereoscopic effect or sense of depth in a two-dimensional image.

Although the distance between the frame portion 101 and the display portion 103 might differ depending on the position in the display portion 103, such as the end portion or the center portion of the display portion 103, the distance is at least greater than 0, preferably 1 mm or more in part of the display portion 103. In particular, the minimum distance between the display surface of the display portion 103 and the surface of the frame portion 101 on the viewer side is 1 cm or more, preferably 5 cm or more, in which case a viewer can feel a strong stereoscopic effect or sense of depth in a two-dimensional image which is displayed on the entire surface of the display portion.

FIG. 1B illustrates the case where four sides of the display portion 103 overlap with the frame portion 101. According to one embodiment of the present invention, without limitation to such a structure, at least part of the display portion 103 may overlap with the frame portion 101. For example, only two sides of the display portion 103 facing each other may overlap with the frame portion 101.

In addition, FIG. 1B illustrates the case where a long side W1 of the display portion 103 is longer than a long side W2 of the opening of the frame portion 101, and a short side of the display portion 103 is longer than a short side of the opening of the frame portion 101. According to one embodiment of the present invention, without limitation to such a structure, either a long side or a short side of the display portion 103 may be longer than that of the opening of the frame portion 101, for example.

Moreover, even when the proportion of display in the display portion 103 that is visible for a viewer is less than 50%, the viewer can feel a stereoscopic effect or a sense of depth. However, in some cases, the viewer grasps the entire display with difficulty, views the display unnaturally, or feels strong fatigue. Thus, it is preferable that a viewer who faces the display surface of the display device can view 50% or more, preferably 70% or more, further preferably 90% or more of display in the display portion 103 through the opening of the frame portion.

A viewer of the display device (see a right eye 30R and a left eye 30L in FIG. 1B) views a two-dimensional image (a still image or a moving image) displayed on the display portion 103 through the opening of the frame portion 101. The viewer can feel a strong stereoscopic effect or sense of depth in the two-dimensional image by viewing display in the display portion 103 through the opening of the frame portion 101 as compared with the case of viewing display in the display portion 103 without through the opening of the frame portion 101.

The viewer can feel a strong stereoscopic effect or sense of depth in a two-dimensional image even when viewing the display portion 103 with one eye. The viewer can feel a stronger stereoscopic effect or sense of depth in a two-dimensional image by viewing the display portion 103 with both eyes and feeling a difference between information that comes into the right eye and information that comes into the left eye.

Note that the frame portion 101 may be attachable and detachable freely. The display device can be used without the frame portion 101 when display which does not require a stereoscopic effect or a sense of depth is made on the display portion 103. In addition, a plurality of attachable and detachable frame portions 101 with different thicknesses may be prepared and the distance between the frame portion 101 and the display portion 103 may be adjusted by replacing the frame portions 101 with each other.

Figure 2B:
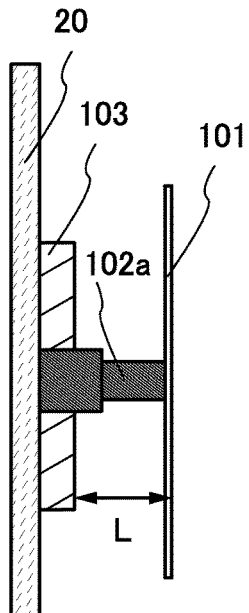
Figure 2C:
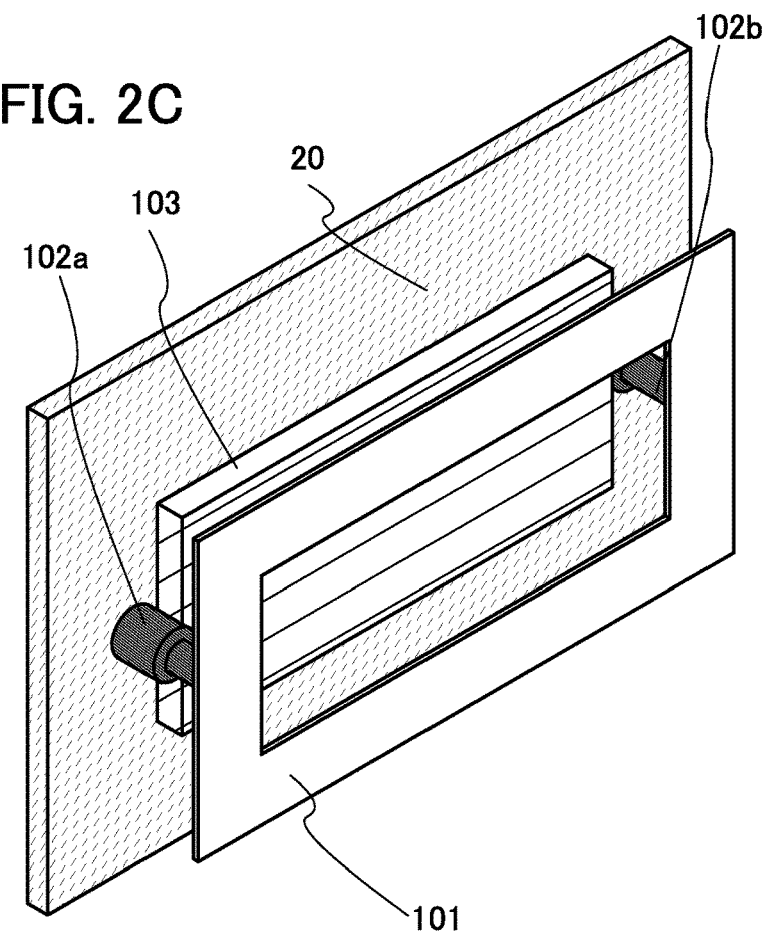

FIGS. 2A to 2C illustrate a display device of another embodiment of the present invention. FIG. 2A is a front view (a view seen from the display surface side) of a display device, FIG. 2B is a side view of the display device, and FIG. 2C is a perspective view of the display device.

The display device in FIGS. 2A to 2C includes the display portion 103 and the frame portion 101. The display portion 103 includes a display surface on the frame portion 101 side. The display portion 103 and the frame portion 101 are located so as to be apart from each other with a distance L therebetween. The distance L between the display portion 103 and the frame portion 101 can be adjusted in accordance with the lengths of driver portions 102a and 102b fixed to a structure body 20. The display portion 103 overlaps with an opening of the frame portion 101, and an end portion of the display portion 103 overlaps with the frame portion 101.

Although examples in which the display device includes two driver portions are illustrated in FIGS. 2A to 2C, one embodiment of the present invention is not limited thereto. For example, the display device may have no driver portion, or the number of driver portions may be one or three or more. A plurality of driver portions may be driven independently or may be driven in synchronization with each other.

Note that the frame portion 101 and the driver portions 102a and 102b may be attachable and detachable freely.

The driver portions 102a and 102b may have functions of successively changing the distance L between the display portion 103 and the frame portion 101. Accordingly, a viewer can adjust the position of the frame portion 101 at any stage; thus, the distance L between the display portion 103 and the frame portion 101 can be decided arbitrarily. Alternatively, the driver portions 102a and 102b may have functions of changing in stages the distance L between the display portion 103 and the frame portion 101. Accordingly, the viewer can select the distance L between the display portion 103 and the frame portion 101 from a plurality of values. The manufacturing cost of the display device and the display device frame can be reduced when the driver portions having functions of gradually changing the distance L between the display portion 103 and the frame portion 101 are used as compared with the case of using the driver portions having functions of successively changing the distance L between the display portion 103 and the frame portion 101.

Note that the driver portions 102a and 102b and the frame portion 101 may be attached to a member of the display device, such as the display panel, or may be attached to a wall surface or a floor on which the display device is disposed. That is, the structure body 20 may be included or may not be included in the display device.

FIGS. 3A to 3D illustrate a display device of another embodiment of the present invention. The display device in FIGS. 3A to 3D differs from the display device in FIGS. 2A to 2C in that four driver portions (driver portions 102a to 102d) and a processing portion 109 are included.

FIGS. 3A and 3B illustrate an example of the case where the frame portion 101 is not parallel to the display portion 103. FIG. 3A is a top view of the display device and FIG. 3B is a perspective view of the display device.

FIGS. 3C and 3D illustrate another example of the case where the frame portion 101 is not parallel to the display portion 103. FIG. 3C is a perspective view of the display device and FIG. 3D is a side view of the display device.

As illustrated in FIGS. 3A to 3D, the frame portion 101 is not necessarily parallel to the display portion 103. For example, FIGS. 3A and 3B illustrate the case where a distance between the frame portion 101 and the display portion 103 gets wider toward the left end of the display portion, and FIGS. 3C and 3D illustrate the case where the distance between the frame portion 101 and the display portion 103 gets wider toward the upper end of the display portion. In some favorable cases, a viewer can feel a stronger stereoscopic effect or sense of depth in a two-dimensional image when the frame portion 101 has an inclination with respect to the display surface.

The display device in FIGS. 3A to 3D includes the processing portion 109. For example, the distance between the frame portion 101 and the display portion 103 and the inclination of the frame portion 101 with respect to the display portion 103 can be changed in accordance with the content of a moving image by having the processing portion 109. Accordingly, such a case is preferable because a viewer can feel a strong stereoscopic effect or sense of depth in a two-dimensional image.

Specifically, for example, when a moving image in which a moving object approaches a viewer is displayed, the distance between the frame portion 101 and the display portion 103 may be expanded as if the frame portion 101 approaches toward the viewer.

Figure 4A:
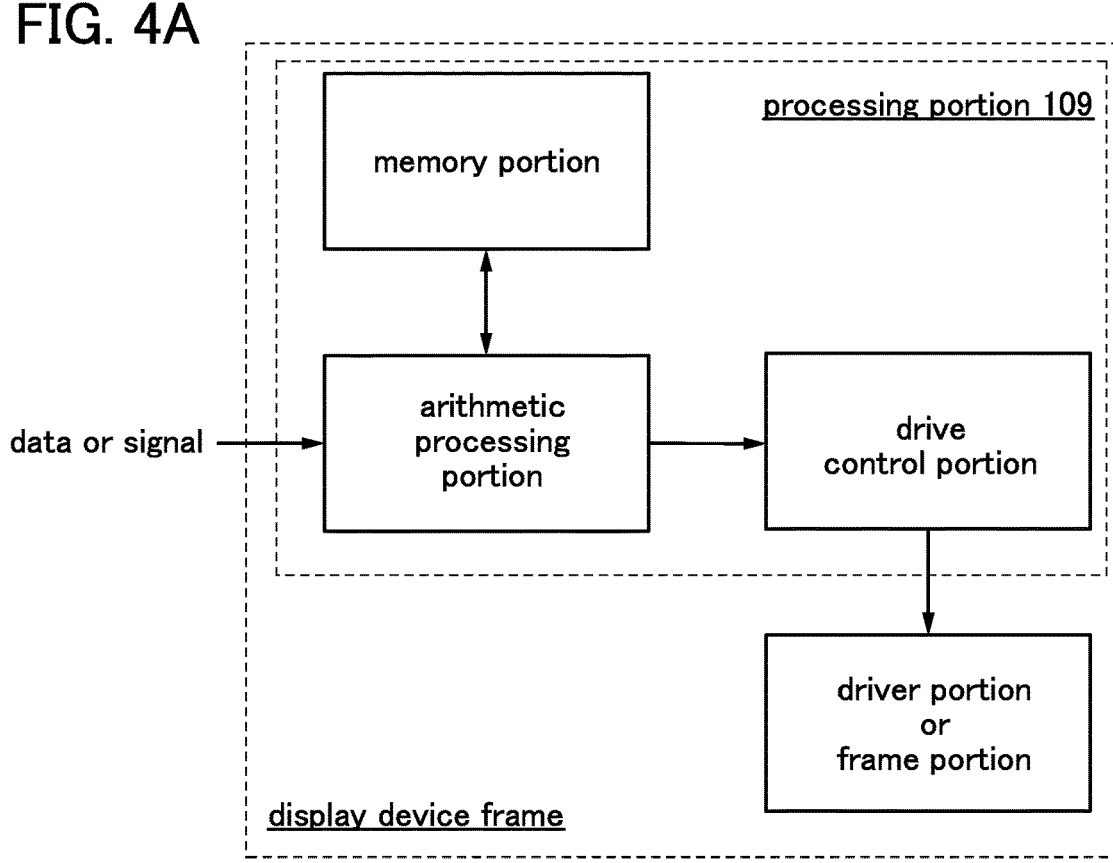
FIGS. 4A and 4B illustrate examples of a display device frame a display device.
Figure 4B:
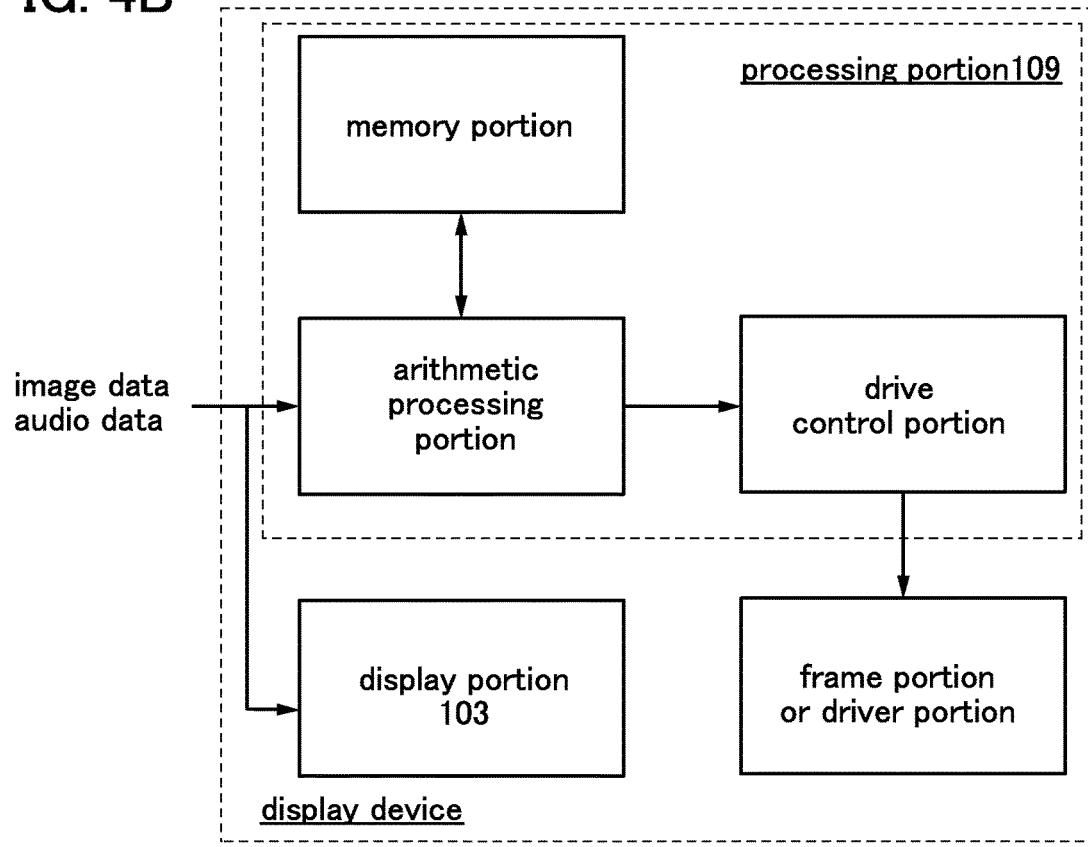

Structure examples of the display device frame and the display device each having the processing portion 109 are shown in FIGS. 4A and 4B. Note that the display device frame may be attached to the display panel or may be worn on the head of a viewer.

The processing portion 109 includes an arithmetic processing portion, a memory portion, and a drive control portion shown in FIGS. 4A and 4B.

An image data displayed on the display portion 103 is supplied to the arithmetic processing portion. The arithmetic processing portion generates a control signal by analyzing the supplied image data.

As the analysis of the image data, spectrum analysis (content analysis) and detection of expansion or movement (zoom-in/zoom-out, pan tilt (panning), the speed of movement, the direction of movement, or the like) can be given.

In the case where an audio data is supplied to the arithmetic processing portion, a control signal may be generated by analyzing the supplied audio data. Alternatively, a control signal may be generated on the basis of the analysis results of both the image data and the audio data.

As the analysis of the audio data, spectrum analysis (content analysis), sound source analysis, and separate extraction of music, human voice, or the like can be given.

Furthermore, as a result of detecting a focal length or a sight line of a viewer or evaluating sensitivity of a stereoscopic effect, fatigue, or the like of the viewer when the viewer views the display portion, data of the results are supplied to the arithmetic portion, in which case a control signal may be generated by analyzing the data.

In addition, the viewer can select the intensity and existence of a stereoscopic effect, the distance between the frame portion and the display portion, or the like, and a signal based on the selection may be supplied to the arithmetic processing portion. In the arithmetic processing portion, a control signal based on the signal may be generated.

In the memory portion, data used for an arithmetic operation in the arithmetic processing portion, arithmetic results, or the like can be stored.

A control signal generated in the arithmetic processing portion is supplied to the drive control portion, and the distance between the frame portion and the display panel can be changed on the basis of the control signal. The distance between the frame portion and the display panel may be changed by moving the frame portion directly or indirectly by moving the driver portion.

FIGS. 5A to 5D illustrate a display device of another embodiment of the present invention and a display panel included in the display device.

Figure 5A:
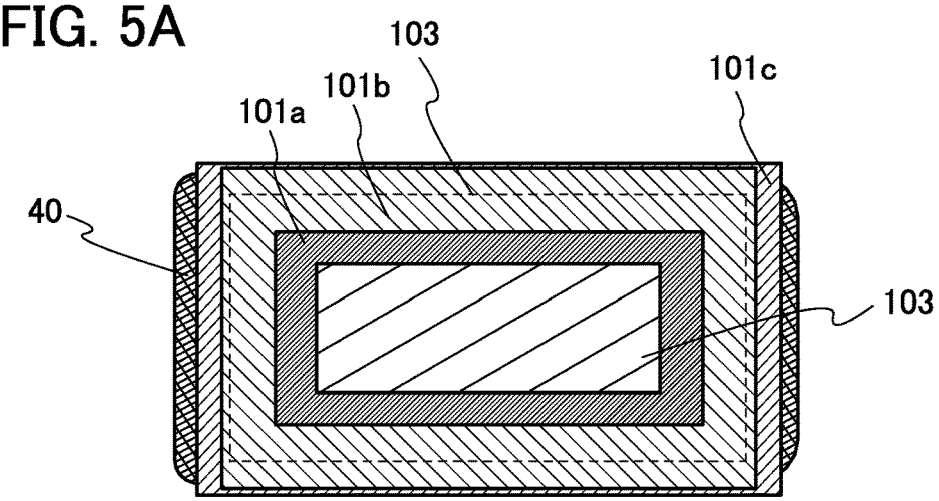
FIGS. 5A to 5D illustrate an example of a display device.
Figure 5B:
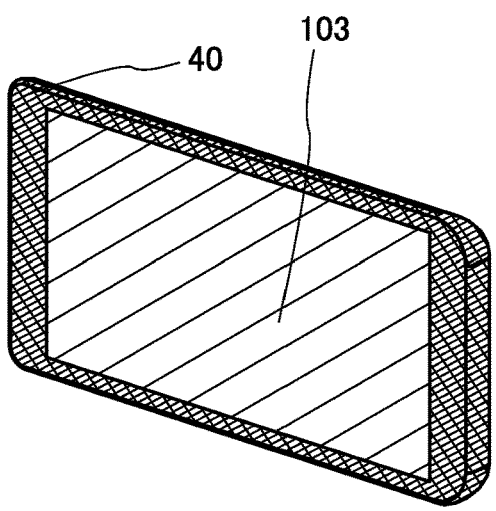

A display device illustrated in FIG. 5A includes a frame portion and a display panel 40. The frame portion includes a first frame portion 101a, a second frame portion 101b, and a third frame portion 101c. The display panel 40 (see FIG. 5B) includes the display portion 103. The display portion 103 overlaps with an opening of the first frame portion 101a, an opening of the second frame portion 101b, and an opening of the third frame portion 101c, and an end portion of the display portion 103 overlaps with at least any one or more of the first frame portion 101a, the second frame portion 101b, and the third frame portion 101c.

Figure 5C:
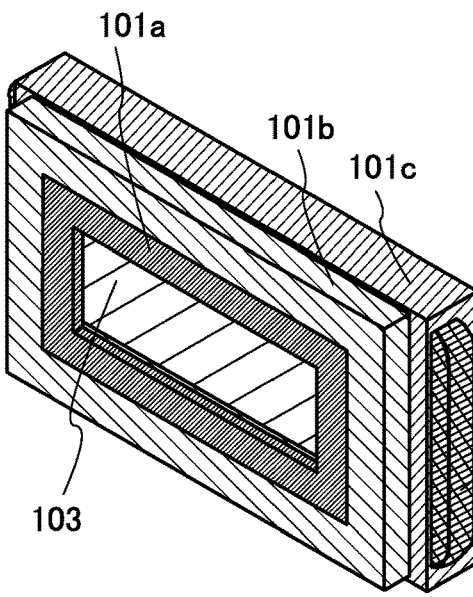
Figure 5D:
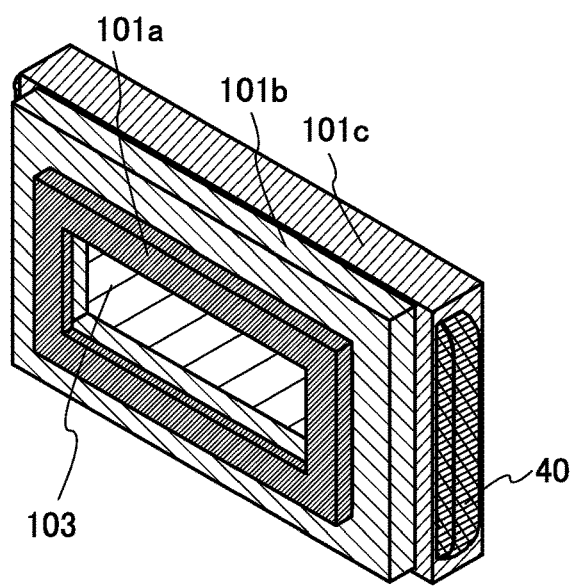

As illustrated in FIGS. 5C and 5D, the display panel 40 can fit inside the third frame portion 101c. The display panel 40 and the frame portion may be integrated with each other, or the display panel 40 may be able to be taken out from the frame portion and used independently of the frame portion.

As illustrated in FIGS. 5C and 5D, the first frame portion 101a is movable in a direction perpendicular to the display surface of the display portion 103, whereby the distance between the frame portion and the display portion can be adjusted.

FIGS. 6A to 6D illustrate a display device of another embodiment of the present invention.

A display device illustrated in FIGS. 6A to 6D includes an attachable and detachable frame portion and the display panel 40. The frame portion includes a first frame portion 101a and a second frame portion 101b. The display panel 40 (see FIG. 5B) includes the display portion 103.

Figure 6A:
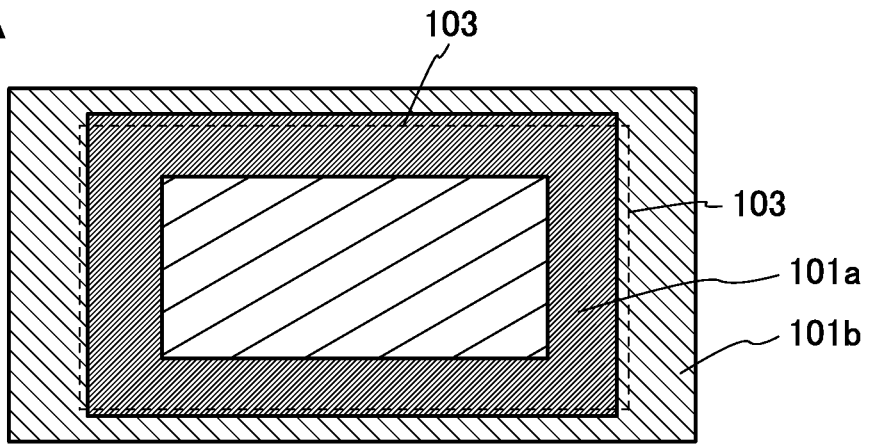
FIGS. 6A to 6D illustrate an example of a display device.
Figure 6B:
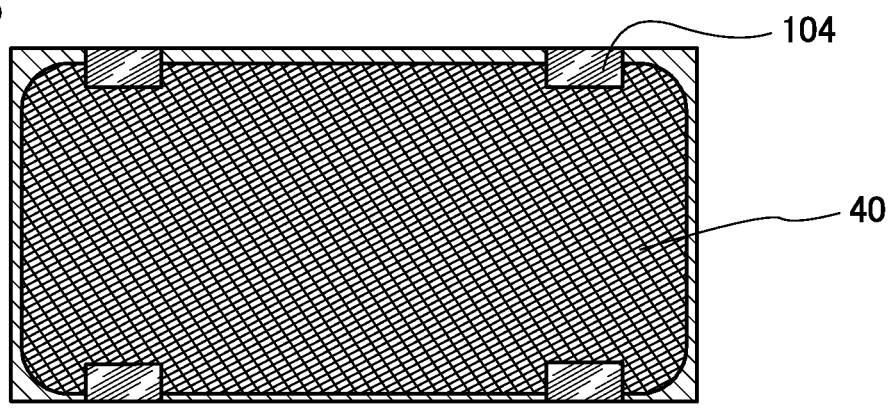
Figure 6C:
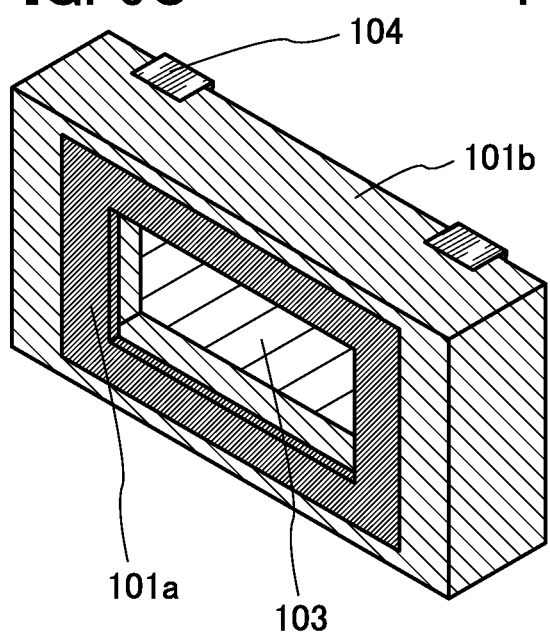
Figure 6D:
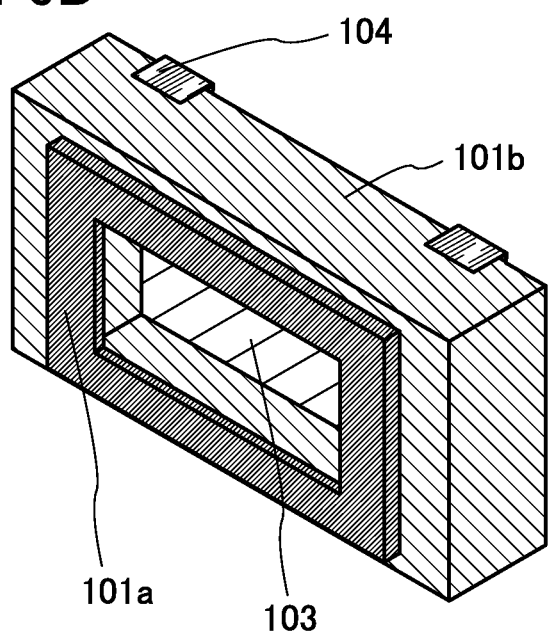

As illustrated in FIGS. 6C and 6D, the frame portion can be attached to the display panel 40 with a hinge 104 (or a hook). As illustrated in FIGS. 6C and 6D, the first frame portion 101a is movable in a direction perpendicular to the display surface of the display portion 103, whereby the distance between the frame portion and the display portion can be adjusted.

<Frame Portion>

The opening of the frame portion may have at least a light-transmitting property that allows a viewer to see display in the display portion, or the opening may also be a space. Alternatively, a plate, a film, or the like made of a material transmitting visible light, such as glass or resin, may overlap with the display portion.

Display that can be viewed through a frame portion is unclear as compared with display that can be viewed through an opening of the frame portion. The frame portion may be formed using a light-transmitting material such as ground glass or frosted glass. The frame portion may have a light-blocking property that makes a viewer difficult to see the display portion through the frame portion or may be formed using a material that does not transmit visible light.

There is no particular limitation on the material used for the frame portion. For example, a material such as glass, quartz, ceramics, sapphire, metal, an organic resin, paper, or wood can be used.

There is no particular limitation on the color of the frame portion. For example, the frame portion may be black, white, blue, green, red, or the like. Black is preferable to enhance how immersed in display content a viewer is.

<Display Portion>

The display device of the embodiment of the present invention may include at least a display portion capable of displaying an image in a plane. Note that an image in this specification may be either a still image or a moving image.

For example, as the display portion, sheet-like or plate-like members of paper, cloth, a resin film, wood, and the like on which various images such as a picture, a painting, and an illustration are displayed can be given.

The display portion may include a display element. As an example of the display portion or a display element of the display portion, an EL element (e.g., an EL element including organic and inorganic materials, an organic EL element, or an inorganic EL element), an LED (e.g., a white LED, a red LED, a green LED, or a blue LED), a transistor (a transistor which emits light in accordance with current), an electron emitter, a liquid crystal element, electronic ink, an electrophoretic element, a grating light valve (GLV), a plasma display panel (PDP), a display element including a micro electro mechanical system (MEMS), a digital micromirror device (DMD), a digital micro shutter (DMS), an interferometric modulator (IMOD) element, a MEMS shutter display element, an optical interference type MEMS display element, an electrowetting element, a piezoelectric ceramic display, or a carbon nanotube, which are display media whose contrast, luminance, reflectivity, transmittance, or the like is changed by electromagnetic action. As an example of a display portion having an EL element, an EL display or the like can be given. As an example of a display portion including an electron emitter, a field emission display (FED), an SED-type flat panel display (SED: surface-conduction electron-emitter display), or the like can be given. As an example of a display portion including a liquid crystal element, a liquid crystal display (e.g., a transmissive liquid crystal display, a semi-transmissive liquid crystal display, a reflective liquid crystal display, a direct-view liquid crystal display, a projection liquid crystal display), or the like can be given. As an example of a display portion including electronic ink or electrophoretic element, electronic paper or the like can be given.

Note that when the display portion is an organic EL display, a viewer tends to feel a strong stereoscopic effect or sense of depth in a two-dimensional image as compared with a liquid crystal display. Therefore, in the embodiment of the present invention, an organic EL display is preferably used for the display portion.

Alternatively, the display portion may be a screen on which an image is projected by a projection device.

The display portion of the display device of the embodiment of the present invention or the display device of the embodiment of the present invention may be an electronic device such as television sets (also called TV or television receivers); monitors for computers or the like; digital photo frames; mobile phones (also called cellular phones or portable telephones); portable game machines; portable information terminals; audio playback devices; or large game machines such as pachinko machines. That is, according to the embodiment of the present invention, a frame portion may be added to an electronic device (corresponding to the display portion), or the frame portion may be included in an electronic device (corresponding to the display device). Alternatively, the above electronic device may include the display device of the embodiment of the present invention.

The display device of the embodiment of the present invention can be used in an amusement park (e.g., a game center, a theme park, or the like), a theater, a cinema, or the like. For example, in accordance with the content of attraction, a viewer can feel a strong stereoscopic effect or sense of depth in a two-dimensional image in such a manner that the distance between the frame portion and the display portion is changed.

Figure 9A:
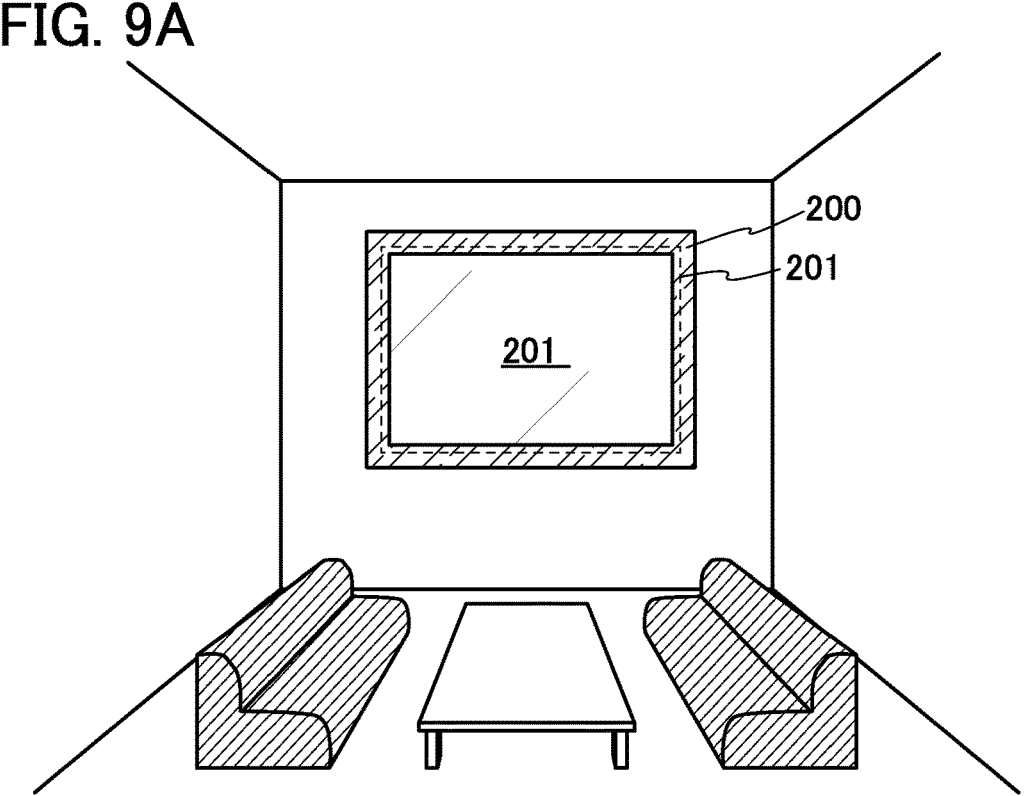
FIGS. 9A and 9B illustrate examples of a display device.
Figure 9B:
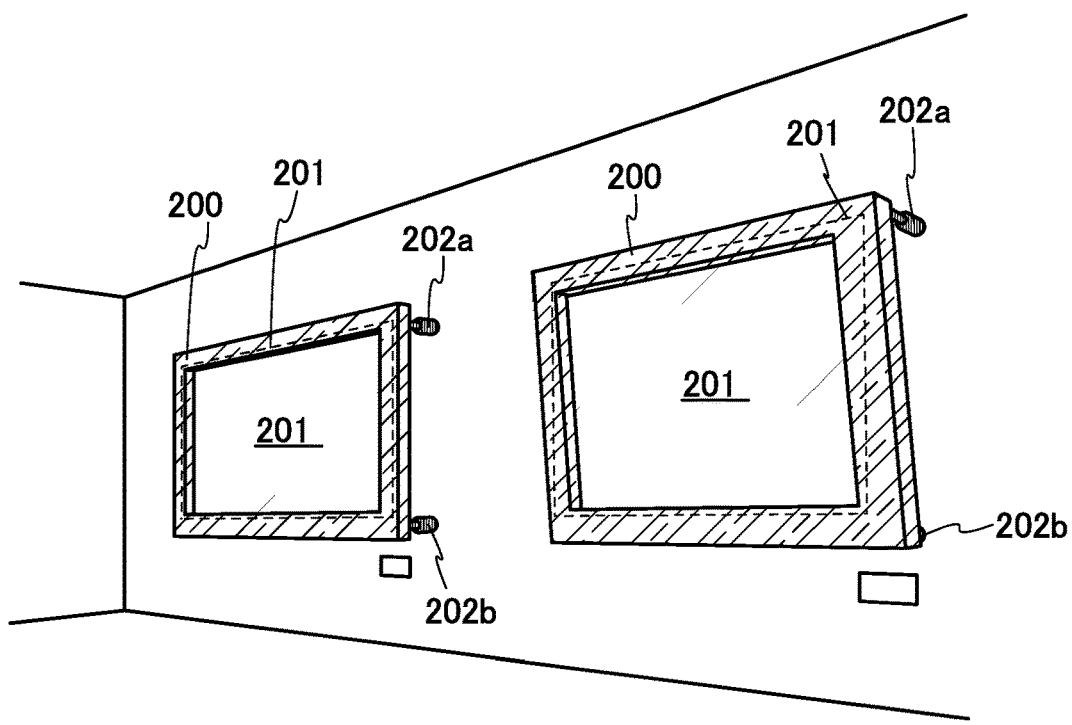

As described above, in any of the embodiments of the present invention, a picture, a painting, or the like can be used as the display portion. In addition, the display device frame of the embodiment of the present invention can be used to display a painting, art, a picture, or the like. FIGS. 9A and 9B each illustrate an example of a display device having a picture frame 200 as a frame portion and a painting 201 as a display portion. FIG. 9A illustrates an example in which a room such as a meeting room is decorated with a painting 201 using the display device of one embodiment of the present invention. In particular, in the case where a landscape painting, a natural painting, or the like is used as the painting 201, a viewer can feel spaciousness as if being in nature as well as a strong stereoscopic effect or sense of depth. FIG. 9B illustrates an example in which paintings 201 are displayed using the display device of one embodiment of the present invention in an art museum or an exhibition. In FIG. 9B, the picture frame 200 includes driver portions at four corners (only driver portions 202a and 202b are illustrated in FIG. 9B). A viewer can feel a strong stereoscopic effect or sense of depth in the paintings 201 having different content because the distance between the painting 201 and the picture frame 200 can be changed using the driver portions in accordance with the content of the painting 201. Moreover, an appropriate distance between the painting 201 and the picture frame 200 might vary among viewers; however, the distance can be adjusted using the driver portions in one embodiment of the present invention so that a viewer can feel a natural stereoscopic effect and less fatigue.

In the display device of one embodiment of the present invention, the distance between the frame portion and the display portion is variable as described above. Therefore, a viewer can feel a strong stereoscopic effect or sense of depth in a two-dimensional image without variation among individuals or regardless of display content. Furthermore, fatigue that the viewer feels can be reduced by providing the frame portion and the display portion with a distance suitable for the viewer as compared with the case where the frame portion and the display portion are fixed to each other with a distance which is not suitable for the viewer.

Note that the display device of the above embodiment of the present invention is one mode of an eye-friendly display device which is less likely to strain eyes. For the display device of the above embodiment of the present invention, technologies of displaying images with less eyestrain (also referred to as a reducing eyestrain technology (REST)) are employed.

EXAMPLE

In this example, a result of sensitivity evaluation carried out to verify whether a viewer can feel a stereoscopic effect in a two-dimensional image displayed on a display device will be described.

A display device used for the sensitivity evaluation includes a light-blocking frame portion, and a display portion which has a display surface on the frame portion side and is located so as to be apart from the frame portion with a distance therebetween. The display portion overlaps with an opening of the frame portion, and the end portion of the display portion overlaps with the frame portion. The distance between the frame portion and the display portion is variable. A display device without a frame portion was also used as a comparative example.

A sheet of black drawing paper was used for the light-blocking frame portion. For the display portion, a 7.4-inch sized organic EL panel having a resolution of Quarter HD (high definition) (960×540) was used.

The frame portion and the display portion (display surface) are substantially parallel to each other and a viewer sees a moving image displayed on the display portion from the front unless otherwise described. The distance between the viewer and the display portion was 50 cm. Evaluation was carried out in a dark room.

The distance between the frame portion and the display portion was set in four types, i.e. 1 cm, 5 cm, 10 cm, and 20 cm.

When the distance between a viewer and the display portion is 50 cm, the size of an opening of the light-blocking frame portion and the size of the display portion appear to be substantially the same from the viewer side (an inner frame (the periphery of the opening) of the frame portion appears to substantially align with an end portion of the display portion) when the distance between the frame portion and the display portion is 20 cm. Therefore, when the distance between the frame portion and the display portion exceeds 20 cm, the viewer can see the end portion of the display portion through the opening of the frame portion.

The following cases were compared to evaluate whether there was a difference in a stereoscopic effect, a sense of depth, and naturalness: the case where a display portion was viewed through an opening of a frame portion of one of the samples, and the case where the display portion was viewed without through the opening of the frame portion, which both displayed the same moving image. There were 11 examinees.

For the evaluation, a sematic differential (SD) method was used. Specifically, a stereoscopic effect, a sense of depth, and naturalness in the moving image of the display portion viewed through the opening of the frame portion of the one sample were evaluated on a scale of +2 to −2 ("extremely strong (+2)", "strong (+1)", "without change (0)", "weak (−1)", and "extremely weak (−2)" using, as a reference, those in the moving image of the display portion of the other sample viewed without through the opening of the frame portion.

Figure 7A:
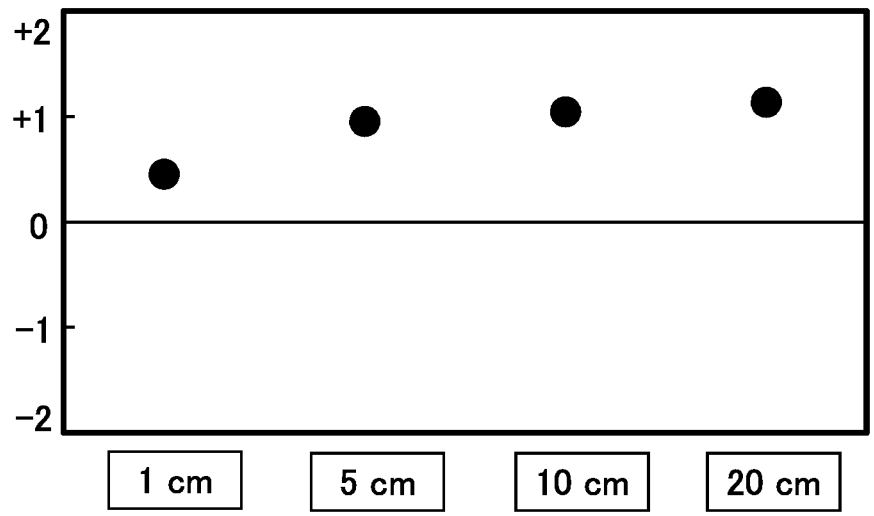
FIGS. 7A and 7B show results in Example.
Figure 7B:
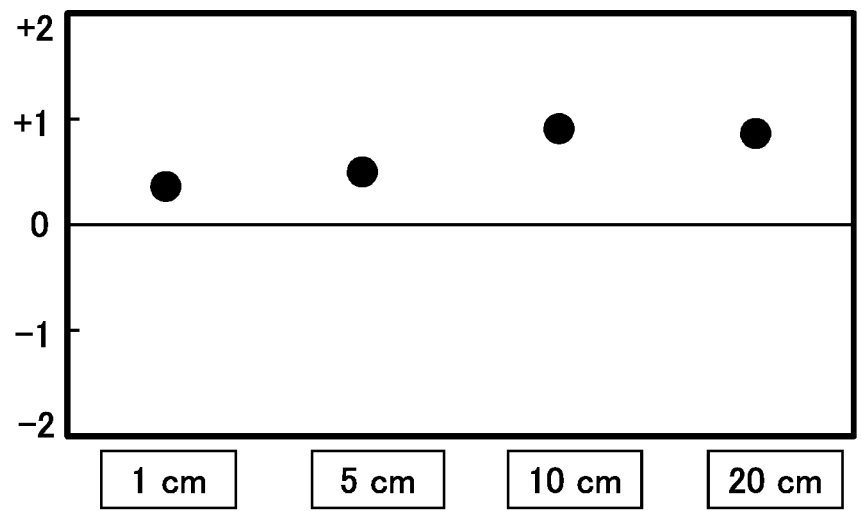
Figure 8:
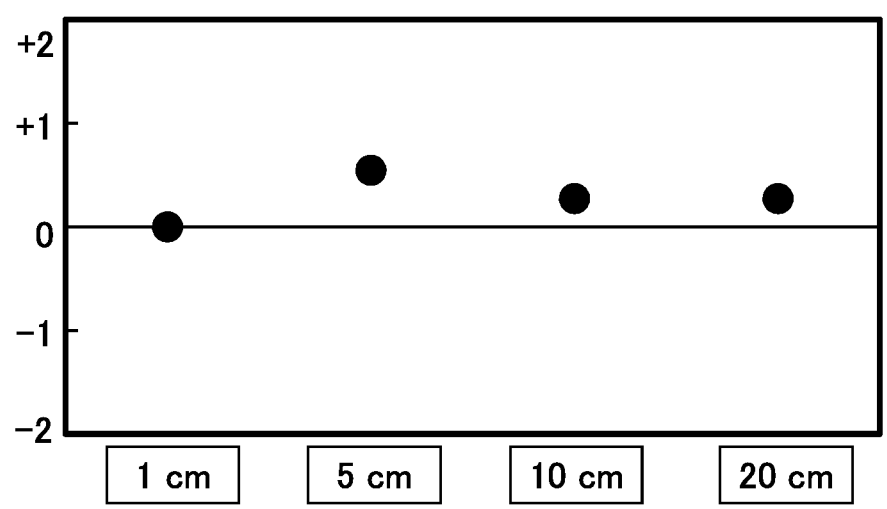
FIG. 8 shows a result in Example.

FIGS. 7A and 7B and FIG. 8 show evaluation results. In each graph, the horizontal axis represents the distance between the frame portion and the display portion. In the evaluation results, the average score of the 11 examinees is shown.

According to FIG. 7A, it is found that when the display portion is viewed through the opening of the frame portion, a stereoscopic effect in the image is strong as compared with the case of viewing the display portion without through the opening of the frame portion regardless of the distance between the frame portion and the display portion. In particular, it is found that a viewer was able to feel a stronger stereoscopic effect in the image on the display portion when the distance between the frame portion and the display portion is larger.

According to FIG. 7B, it is found that when the display portion is viewed through the opening of the frame portion, a sense of depth in the image is strong as compared with the case of viewing the display portion without through the opening of the frame portion regardless of the distance between the frame portion and the display portion. In particular, a viewer tends to feel a stronger sense of depth in the image of the display portion when the distance between the frame portion and the display portion is larger.

In addition, according to FIG. 8, it is found that when the case of viewing the display portion without through the opening of the frame portion and the case of viewing the display portion through the opening of the frame portion were compared, there was no difference in naturalness of the image, or the image appeared more natural in the case of viewing the display portion through the opening of the frame portion.

Note that although not shown in a graph, when the end portion of the display portion was able to be seen through the opening of the frame portion, a strong stereoscopic effect and sense of depth were unlikely to be obtained and further a stereoscopic effect or a sense of depth was weakened as compared with the case where the display portion was viewed without through the opening of the frame portion. In addition, when the end portion of the display portion was able to be seen through the opening of the frame portion, the viewer felt tired strongly and the image appeared abnormal to the viewer. Accordingly, in the display device of one embodiment of the present invention, it is preferable that the distance between the frame portion and the display portion be able to be controlled so that the end portion of the display portion overlaps with the frame portion and a viewer cannot see the end portion of the display portion.

As described above, it was found that the display device including the frame portion used in this example can have a stronger stereoscopic effect and sense of depth in a two-dimensional image as compared with the display device not including the frame portion.

This application is based on Japanese Patent Application serial no. 2013-244742 filed with Japan Patent Office on Nov. 27, 2013, the entire contents of which are hereby incorporated by reference.

What is claimed is:

1. A display device giving a viewer a stereoscopic effect in a two-dimensional image, the display device comprising:
   a frame portion having an opening; and
   a display portion having a display surface,
   a processing portion, wherein the processing portion comprises a memory portion, an arithmetic processing portion, and a drive control portion, and
   wherein the processing portion is configured to generate a signal to change the distance between the frame portion and the display surface by analyzing an image data,
   wherein the opening of the frame portion overlaps with the display portion,
   wherein 50% or more of display of the display portion is visible through the opening of the frame portion,
   wherein the frame portion overlaps with an end portion of the display portion,
   wherein one point of the frame portion and a corresponding point of the display surface are positioned with a first length between them, and wherein the frame portion is moveable relative to the display to a different position wherein the same corresponding points of the frame portion and the display surface are positioned with a different second length between them, and
   wherein a parallax barrier is not provided in the display device.

2. The display device according to claim 1, wherein the frame portion has a light-blocking property.

3. The display device according to claim 1, further comprising:
   a driver portion attached to the frame portion,
   wherein a length of the driver portion is variable.

4. The display device according to claim 1, wherein an inclination of the frame portion with respect to the display surface is variable.

5. A display device giving a viewer a stereoscopic effect in a two-dimensional image, the display device comprising:
   a structure body;
   a frame portion having an opening;
   a processing portion comprising a memory portion, an arithmetic processing portion, and a drive control portion;
   a driver portion between the structure body and the frame portion; and
   a display portion having a display surface,
   wherein the opening of the frame portion overlaps with the display portion,
   wherein 50% or more of display of the display portion is visible through the opening of the frame portion,
   wherein the frame portion overlaps with an end portion of the display portion,
   wherein the display portion is between the structure body and the frame portion,
   wherein the driver portion is configured to change a length between a point on the frame portion and a corresponding point on the display surface in accordance with a signal generated from the processing portion by analyzing an image data, wherein the change in length results from moving the frame portion relative to the display surface from a first position having a first length between the corresponding points, to a second position where the same corresponding points have a different second length between them, and wherein a parallax barrier is not provided in the display device.

6. The display device according to claim 5, wherein the frame portion has a light-blocking property.

7. The display device according to claim 5,
wherein the processing portion is provided in the structure body.

8. The display device according to claim 5,
wherein the processing portion is provided in the frame portion.

9. The display device according to claim 5, wherein an inclination of the frame portion with respect to the display surface is variable.

10. A frame giving a viewer a stereoscopic effect in a two-dimensional image, the frame comprising:
a display panel having a display portion configured to display an image data;
a frame portion having an opening configured to be attached to the display panel; and
a processing portion in the frame portion,
wherein 50% or more of display of the display portion is visible through the opening of the frame portion,
wherein the processing portion comprises an arithmetic processing portion, a memory portion, and a drive control portion,
wherein the arithmetic processing portion is configured to generate a control signal by analyzing the image data,
wherein the drive control portion is configured to change a length between a point of the frame portion and a corresponding point of the display portion in accordance with the control signal, wherein the change in length results from moving the frame portion relative to a display surface of the display portion from a first position having a first length between the corresponding points, to a second position where the same corresponding points have a different second length between them, and
wherein a parallax barrier is not provided in the display device.

11. The frame according to claim 10, wherein the frame portion has a light-blocking property.

12. The frame according to claim 10, further comprising:
a driver portion,
wherein a length of the driver portion is variable, and
wherein the driver portion is configured to be controlled by the drive control portion to change the distance between the frame portion and the display portion.

13. The display device according to claim 10, wherein an inclination of the frame portion with respect to the display portion is variable.

* * * * *